(12) United States Patent
Robilliard et al.

(10) Patent No.: US 6,804,435 B2
(45) Date of Patent: Oct. 12, 2004

(54) FIBER COLLIMATOR COUPLING ASSEMBLY

(75) Inventors: Craig Robilliard, Bloomington, MN (US); James Kochendorfer, Plymouth, MN (US); Alan Blair, St. Paul, MN (US); Jeffrey Peter Treptau, Lakeville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 132 days.

(21) Appl. No.: 10/103,475

(22) Filed: Mar. 21, 2002

(65) Prior Publication Data

US 2003/0179992 A1 Sep. 25, 2003

(51) Int. Cl.[7] .................................................. G02B 6/32
(52) U.S. Cl. ............................. 385/33; 385/34; 385/74; 385/31
(58) Field of Search ............................. 385/31, 33, 34, 385/35, 58–61, 66–74, 85, 78–80, 84, 14, 16, 27, 24, 39, 43, 47, 88, 89

(56) References Cited

U.S. PATENT DOCUMENTS

| | | | |
|---|---|---|---|
| 4,213,677 A | 7/1980 | Sugimoto et al. ............... 385/34 |
| 4,474,424 A | 10/1984 | Wagner ............................ 385/24 |
| 4,550,975 A | 11/1985 | Levinson et al. ............... 385/34 |
| 5,539,577 A | 7/1996 | Si et al. ........................... 359/629 |
| 5,612,824 A | 3/1997 | Si et al. ........................... 359/652 |
| 5,734,762 A * | 3/1998 | Ho et al. .......................... 385/11 |
| 5,781,341 A | 7/1998 | Lee ................................... 359/378 |
| 5,799,121 A | 8/1998 | Duck et al. ...................... 385/47 |
| 5,845,023 A | 12/1998 | Lee ................................... 385/33 |
| 5,889,904 A | 3/1999 | Pan et al. ......................... 385/24 |
| 5,917,626 A | 6/1999 | Lee ................................... 359/131 |
| 6,002,818 A | 12/1999 | Fatehi et al. ..................... 385/17 |
| 6,040,944 A | 3/2000 | Pan et al. ......................... 357/590 |
| 6,055,347 A | 4/2000 | Li et al. ........................... 385/34 |
| 6,084,994 A | 7/2000 | Li et al. ........................... 385/31 |
| 6,132,106 A | 10/2000 | Yokoyama ....................... 385/74 |
| 6,160,932 A | 12/2000 | Huang et al. .................... 385/24 |
| RE37,044 E | 2/2001 | Wu ................................... 385/31 |
| 6,185,347 B1 * | 2/2001 | Zheng .............................. 385/34 |
| 6,198,858 B1 | 3/2001 | Pan et al. ......................... 385/24 |
| 6,415,067 B1 | 7/2002 | Copner et al. ................... 385/16 |
| 6,430,337 B1 | 8/2002 | Bergmann et al. .............. 385/25 |
| 6,477,289 B1 | 11/2002 | Li ..................................... 385/16 |
| 6,546,169 B1 * | 4/2003 | Lin et al. .......................... 385/39 |
| 2001/0046345 A1 | 11/2001 | Snyder et al. ................... 385/16 |
| 2002/0101634 A1 | 8/2002 | Ye .................................... 398/65 |
| 2002/0106153 A1 | 8/2002 | Wu et al. .......................... 385/43 |
| 2003/0081901 A1 | 5/2003 | Gage et al. ...................... 385/48 |
| 2003/0081908 A1 | 5/2003 | Gage et al. ...................... 385/74 |

FOREIGN PATENT DOCUMENTS

| | | | |
|---|---|---|---|
| JP | 09304647 A | 11/1997 | ........... G02B/6/28 |
| JP | 2001147341 A | 5/2001 | ........... G02B/6/26 |

OTHER PUBLICATIONS

U.S. patent application No. 10/655,735—"Method for Face-Mounting Optical Components and Devices".
U.S. patent application No. 10//655,920—"Fiber Optic Tap With Compensated Spectral Filter".

\* cited by examiner

*Primary Examiner*—Akm Enayet Ullah
*Assistant Examiner*—Kevin S. Wood
(74) *Attorney, Agent, or Firm*—Carlson, Caspers, Vandenburgh & Lindquist

(57) ABSTRACT

An optical device has a first collimator sub-assembly having a first free-space end, and a second collimator sub-assembly having a second free-space end opposing the first free-space end of the first collimator. A central housing has first and second ends and is disposed between the first and second collimator sub-assemblies. A first ring on the first collimator sub-assembly is mounted to the first end of the central housing and a second ring on the second collimator sub-assembly is mounted to the second end of the central housing.

27 Claims, 5 Drawing Sheets

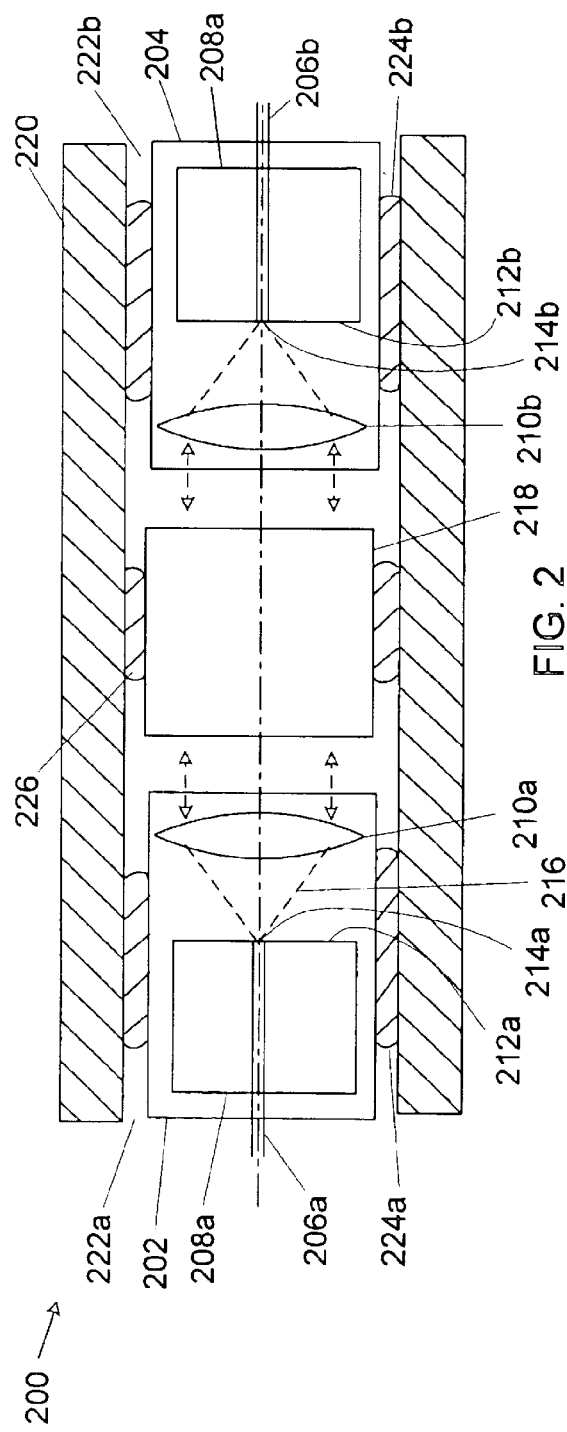
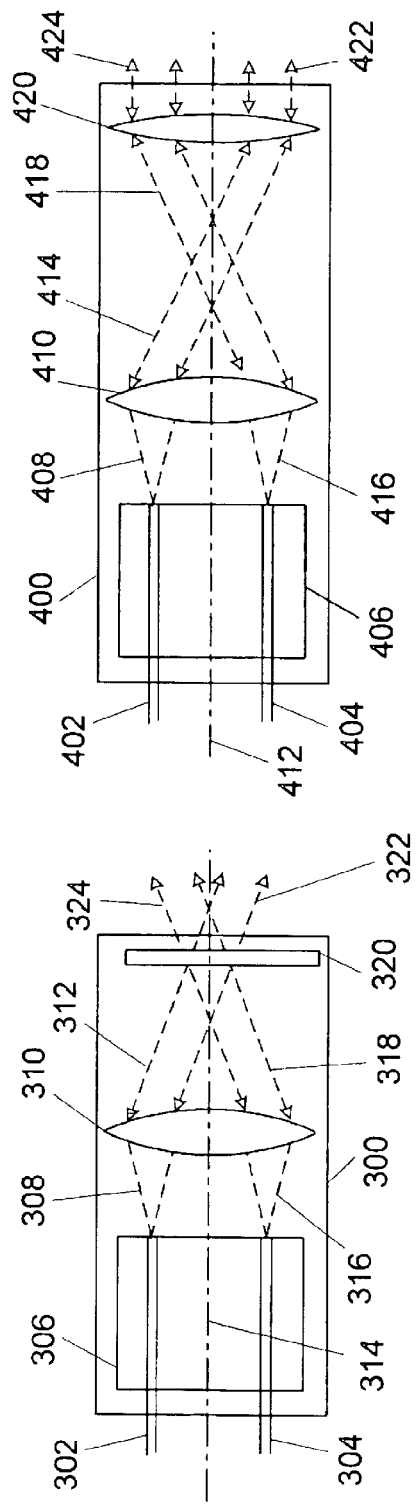

FIBER COLLIMATOR COUPLING ASSEMBLY

FIELD OF THE INVENTION

The present invention is directed generally to fiber optical components, and more particularly to an assembly for mounting fiber collimator sub-assemblies.

BACKGROUND

Optical fibers find many uses for directing beams of light between two points. Optical fibers have been developed to have low loss, low dispersion, polarization maintaining properties and can be incorporated into several different types of devices, such as amplifiers, filters, lasers and interferometers. As a result, optical fiber systems find widespread use, for example in optical communications.

There are several optical components, however, that are important for use in fiber systems or in fiber system development, and that are not implemented in a fiber-based form where the optical beam is guided in a waveguide. Instead, these optical components are implemented in a bulk form, and through which the light propagates freely. Examples of such components include, but are not limited to, filters, isolators, circulators, polarizers, switches and shutters. Consequently, the inclusion of a bulk component in an optical fiber system necessitates that the optical fiber system have a section where the beam path propagates freely in space, rather than being guided within a fiber.

Free space propagation typically requires use of collimation units, also known as collimator sub-assemblies, at the ends of the fibers to produce collimated beams. Therefore, a device may have a collimator sub-assembly at each end, defining one or more collimated beam paths to their respective fibers. One difficulty in manufacturing a fiber optic device is ensuring that the collimated beam paths from the two collimator sub-assemblies overlap one another and are parallel to each other. This leads to complex and often, therefore, labor intensive procedures for aligning modules that contain sub-assemblies.

SUMMARY OF THE INVENTION

Accordingly, there is a need for an improved approach to coupling collimator sub-assemblies.

One particular embodiment of the invention is directed to an optical device that has a first collimator sub-assembly having a first free-space end, and a second collimator sub-assembly having a second free-space end opposing the first free-space end of the first collimator. A central housing has first and second ends and is disposed between the first and second collimator sub-assemblies. A first ring on the first collimator sub-assembly is mounted to the first end of the central housing and a second ring on the second collimator sub-assembly is mounted to the second end of the central housing.

Another embodiment of the invention is directed to an optical system, that includes an optical transmitter producing output light and an optical receiver receiving at least a portion of the output light. An optical fiber link couples between the optical transmitter and the optical receiver. The optical fiber link includes a fiber device having a first collimator sub-assembly with a first free-space end, and a second collimator sub-assembly with a second free-space end opposing the first free-space end of the first collimator. A central housing has first and second ends and is disposed between the first and second collimator sub-assemblies. A first ring on the first collimator sub-assembly is mounted to the first end of the central housing and a second ring on the second collimator sub-assembly is mounted to the second end of the central housing.

Another embodiment of the invention is directed to a method of manufacturing a fiber device. The method includes providing a first and a second collimator sub-assembly, each collimator sub-assembly being provided with rings on outside surfaces of respective sub-assembly housings. A central housing is placed between the first and second collimator sub-assemblies. A first mounting face of the ring of the first collimator sub-assembly is attached to a first end of the central housing. A second mounting face of the ring of the second collimator sub-assembly is attached to a second end of the central housing so that light passes in free space between the first and second collimator sub-assemblies.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 2 schematically illustrates a fiber-optic filter unit;

FIG. 3 schematically illustrates one type of dual fiber collimator unit;

FIG. 4 schematically illustrates another type of dual fiber collimator unit.

Figure 1:
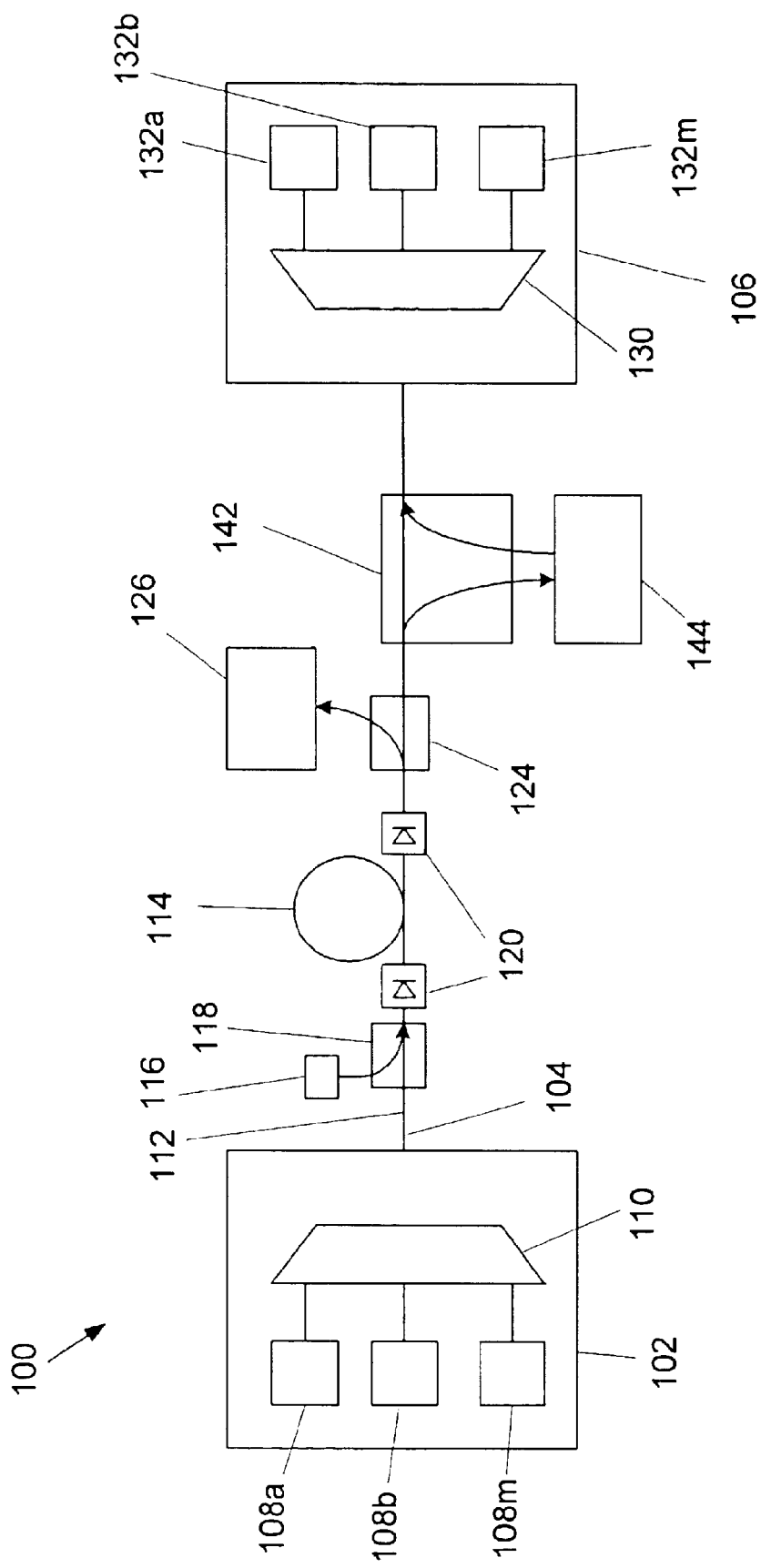
FIG. 1 schematically illustrates a fiber optic communications system, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to fiber optic devices, and is believed to be particularly useful with fiber optic devices, such as filters, isolators, circulators, and the like, in which light from a fiber is collimated before being incident on an optical element, and is then refocused to one or more fibers.

A schematic of an embodiment of an optical communications system 100 is presented in FIG. 1. A DWDM transmitter 102 directs a DWDM signal having m channels through a fiber communications link 104 to a DWDM receiver 106.

In this particular embodiment of DWDM transmitter 102, a number of light sources 108a, 108b–108m generate light at different wavelengths, λa, λb . . . λm, corresponding to the different optical channels. The light output from the light sources 108a–108m is combined in a DWDM combiner unit 110, or multiplexer (MUX) unit to produce a DWDM output 112 propagating along the fiber link 104.

Light sources 108a–108m are typically laser sources whose output is externally modulated, although they may also be internally modulated laser sources, or the like. It will be appreciated that the DWDM transmitter 102 may be configured in many different ways to produce the DWDM output signal. For example, the MUX unit 110 may include an interleaver to interleave the outputs from different multiplexers. Furthermore, the DWDM transmitter 102 may be equipped with any suitable number of light sources for generating the required number of optical channels. For example, there may be twenty, forty or eighty optical channels, or more. The DWDM transmitter 102 may also be redundantly equipped with additional light sources to replace failed light sources.

Upon reaching the DWDM receiver 106, the DWDM signal is passed through a demultiplexer unit (DMUX) 130, which separates the multiplexed signal into individual channels that are directed to respective detectors 132a–132m.

The fiber link 104 may include one or more fiber amplifier units 114, for example rare earth-doped fiber amplifiers, Raman fiber amplifiers or a combination of rare earth-doped and Raman fiber amplifiers. The pump light may be introduced to the fiber amplifier 114 from a pump unit 116 via a coupler 118. Optical isolators 120 may be positioned along the fiber link 104 to prevent light from passing in the backwards direction. For example isolators 120 may be positioned on either side of the amplifier 140 to reduce the possibility of backscattered light, propagating towards the transmitter 102, from being amplified in the amplifier 114.

The fiber link 104 may include one or more DWDM channel monitors 126 for monitoring the power in each of the channels propagating along the link 104. Typically, a fraction of the light propagating along the fiber link 104 is coupled out by a tap coupler 124 and directed to the DWDM channel monitor 126. The fiber link 104 may also include one or more gain flattening filters (not illustrated), typically positioned after an amplifier unit 114, to make the power spectrum of different channels flat. The channel monitor 126 may optionally direct channel power profile information to the gain flattening filter. The gain flattening filter may, in response to the information received from the channel monitor 126, alter the amount of attenuation of different channels in order to maintain a flat channel power profile, or a channel power profile having a desired profile.

The fiber link 104 may include one or more optical add/drop multiplexers (OADM) 142 for directing one or more channels to a local loop 144. The local loop 144 may also direct information back to the OADM 142 for propagating along the fiber link 104 to the DWDM receiver 106. It will be appreciated that the information directed from the local loop 144 to the OADM 142 need not be at the same wavelength as the information directed to the local loop 144 from the OADM 142. Furthermore, it will be appreciated that the OADM 142 may direct more than one channel to, and may receive more than one channel from, the local loop 144. The amount of light being added to the fiber link 104 from the local loop 144 may be monitored by a channel monitor to ensure that the light in the channel(s) being added to the fiber link has an amplitude similar to that of the existing channels.

A schematic illustration of one embodiment of a fiber optic device 200 is presented in FIG. 2. The device includes left and right single fiber collimator (SFC) sub-assemblies 202 and 204 mounted in opposing directions. Each sub-assembly includes a fiber 206a and 206b mounted in a ferrule 208a and 208b. A lens 210a and 210b is positioned to collimate light passing out of the respective fiber 206a and 206b, or to focus light into the respective fiber 206a and 206b. The lens 210a and 210b may be any type of suitable lens, including a gradient index (GRIN) lens, or a lens having a curved refractive surface, such as a spherical or aspherical lens. Typically, the ferrule end 212a and 212b and fiber end 214a and 214b are polished at a small angle to reduce back reflections.

Considering the example where light enters the device 200 through the left sub-assembly 202, the light 216 from the sub-assembly 202 is collimated, may pass through the optical component 218, disposed between the two sub-assemblies 202 and 204, to the second sub-assembly. The optical component 218 may be any suitable type of optical component that operates on the light propagating in free space including, but not restricted to an isolator, a circulator, a filter, or the like. It will also be appreciated that the light may pass from the right sub-assembly 204 to the left sub-assembly 202.

One or both of the sub-assemblies 202 and 204 may also include additional optical components not illustrated. For example, the left and/or right sub-assembly 202 and 204 may include a filter. Additionally, there may be no optical component 218 mounted within the housing separately from the sub-assemblies 202 and 204, with the only optical component(s) within the device 200 being mounted within the sub-assemblies 202 and 204 themselves.

The sub-assemblies 202 and 204 are often disposed within a housing 220. Typically, both the housing 220 and the sub-assemblies 202 and 204 are cylindrical in shape, so that the sub-assemblies 202 and 204 easily slip into the respective housing ends 222a and 222b. The sub-assemblies 202 and 204 are mounted within the housing 220 using respective bands of adhesive 224a and 224b. Likewise, the element 218 may be mounted in the housing 220 using adhesive 226.

Often, the only mechanical support to the sub-assemblies 202 and 204 is provided by the adhesive 224a and 224b itself, which may not be applied evenly around the sub-assemblies 202 and 204. The clearance between housing 220 and the sub-assemblies 202 and 204 is typically around 300 μm to allow the required alignment between the sub-assemblies, thus requiring a thick layer of adhesive 224a and 224b. Due to the different thermal expansion coefficients of the adhesive 224a and 224b and the housing 220, typically formed of metal, any asymmetry in the adhesive 224a and 224b results in shifting, and subsequent misalignment, of the components with temperature.

Figure 5:
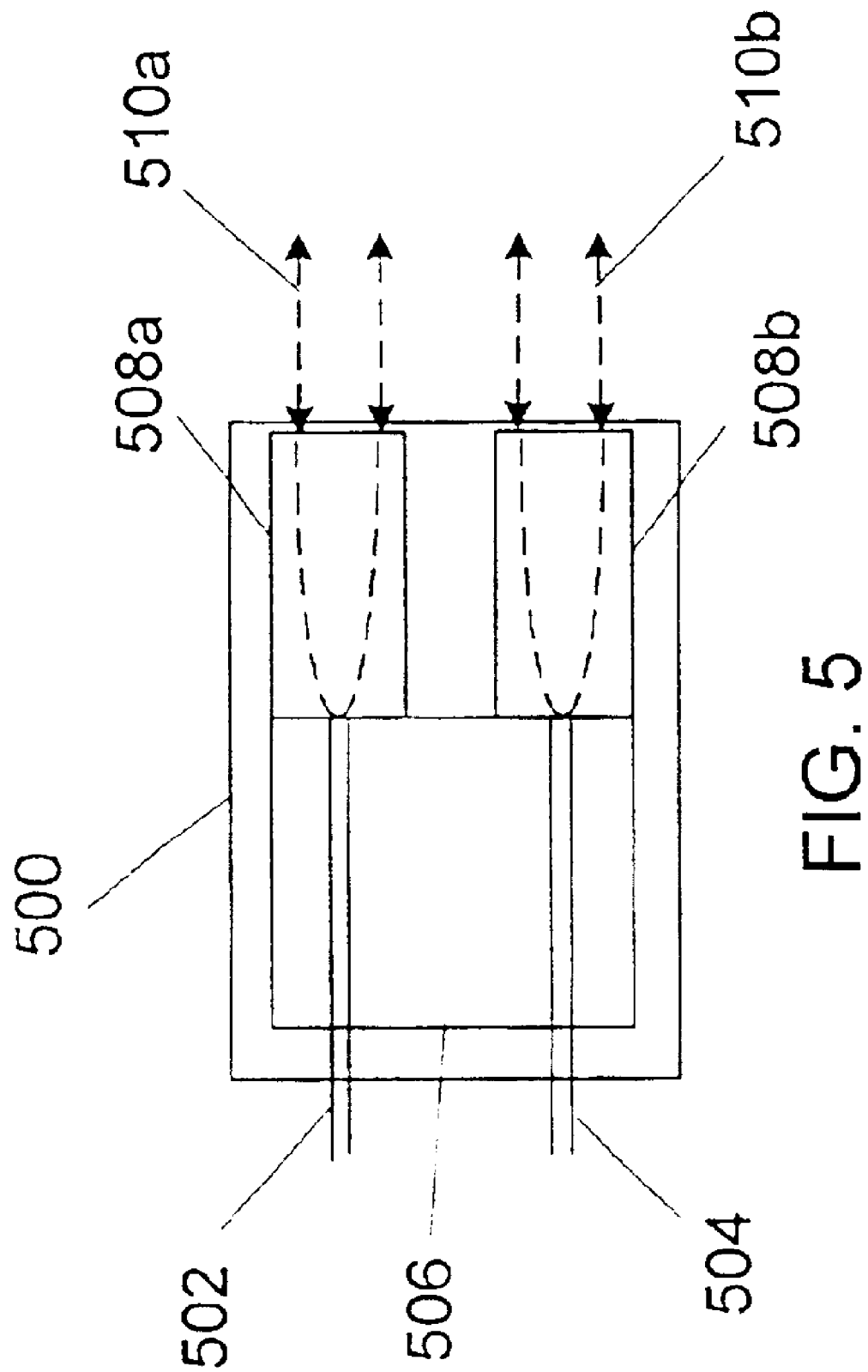
FIG. 5 schematically illustrates another type of dual fiber collimator unit.

Other types of collimator sub-assembly are illustrated in FIGS. 3–5. In FIG. 3, a dual fiber collimator (DFC) sub-assembly 300 includes two fibers 302 and 304 held in a dual fiber ferrule 306. Light 308 from the first fiber 302 is directed to a lens 310. The first fiber 302 is typically positioned at a distance from the lens 310 of about the focal length of the lens 310, so that the light 312 emerging from the lens 310 is approximately collimated. However, the first fiber 302 is not positioned on the axis 314 of the lens 310, and so the collimated light 312 does not propagate parallel to the axis 314. The light path 316 from the second fiber 304 to the lens 310 is likewise diverging and, following the lens 310, the light path 318 is collimated, but off-axis.

The DFC 300 may optionally include an optical element 320, such as an optical filter. In the particular embodiment illustrated, light 312 from the first fiber 302 is reflected as light 318 back to the second fiber 304 by the filter 320, while some light 322 is transmitted through the filter 320. There may also be a path 324 for light transmitted through the filter 320 that passes to the second fiber 304.

A DFC such as the DFC 300 is useful for introducing a collimated, but off-axis, light beam to an optical element, such as a filter. For example, a device having two opposing DFCs may be used with an interference filter between the DFCs to combine or separate light of different wavelengths, and is commonly used as a multiplexer or demultiplexer in optical communications systems that use multiple channel optical signals.

Another type of collimator sub-assembly 400 is schematically illustrated in FIG. 4. This sub-assembly 400 uses two lenses to produce substantially collimated beams that propagate parallel to an axis, from two or more fibers. In the particular embodiment illustrated, two fibers 402 and 404 are mounted in a dual fiber ferrule 406. The light path 408 from the first fiber 402 diverges to the first lens 410. The first lens 410 focuses the light, reducing the divergence. Since the first fiber is not positioned on the lens axis 412, the light path 414 emerging from the first lens 410 crosses the axis 412. Likwise the light path 416 from the second fiber diverges to the lens 410 and the light path 418 from the lens 410 is directed across the axis 412. A second lens 420 parallelizes the light paths 414 and 418 so that they propagate in a direction parallel to the axis 412.

This type of collimator sub-assembly may be used to produce substantially parallel beams from more than two fibers. Furthermore, with careful selection of the focal lengths of the lenses 410 and 420, and with careful selection of the relative spacings between the two lenses 410 and 420, and the fibers 402 and 404, the parallelized light paths 422 and 424 may be substantially collimated. This type of collimator sub-assembly is described in greater detail in U.S. Pat. No. 6,289,152, which is incorporated by reference.

The second lens 420 may be replaced with a biprism. However, this is effective at paralellizing only light from fibers set at one particular distance from the optical axis 412, whereas the approach using the second lens 420 is useful for parallelizing light from fibers set at different distances from the axis 412. The sub-assembly 400 is useful for optical devices that require multiple, parallelized beams, for example isolators, circulators, and the like.

Another type of collimator sub-assembly 500 is illustrated in FIG. 5. The sub-assembly 500 includes at least two fibers 502 and 504 mounted in a ferrule 506. Each fiber 502 and 504 has a respective lens 508a and 508b disposed at its output to collimate the light 510a and 510b produced from the fibers 502 and 504. The lenses 508a and 508b may be GRIN lenses, as illustrated, or may be lenses having a curved refractive surface.

Like the sub-assembly 400 shown in FIG. 4, the sub-assembly 500 produces multiple parallel collimated beams from multiple fibers. However, this sub-assembly needs a single lens for each fiber, whereas the sub-assembly 400 is capable of producing collimated, parallel light paths, irrespective of the number of fibers present.

It will be appreciated that in the different types of sub-assembly illustrated in FIGS. 2–5, a lens described as collimating or focusing light emerging from a fiber may also be used to focus light into the fiber where the light propagates in the opposite direction from that described.

Fiber optic devices may be constructed using any combination of the collimator sub-assemblies discussed above. Furthermore, other collimator sub-assemblies, not described here, may be used in a fiber optic device. Additionally, a central section may be positioned within the housing between the sub-assemblies, for example to hold additional optical elements.

Figure 6:
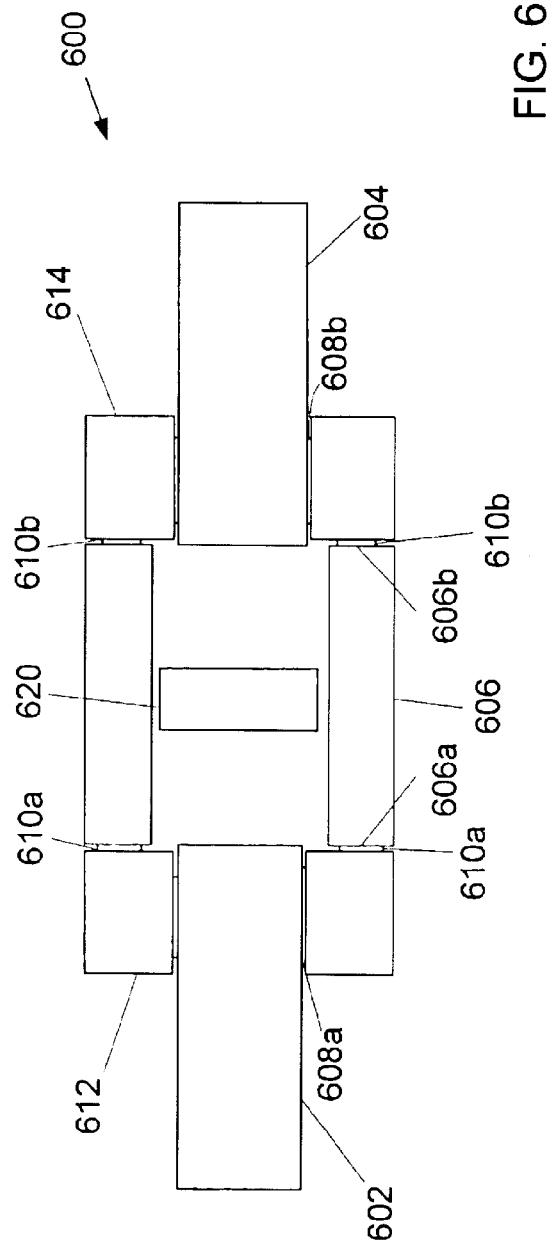
FIG. 6 schematically illustrates a fiber device assembled from two collimator units, according to an embodiment of the present invention.

An embodiment of a different approach to mounting collimator sub-assemblies is illustrated schematically in FIG. 6. In this embodiment, a fiber optic device 600 is formed from two collimator sub-assemblies 602 and 604 aligned relative to one another, separated by a central housing 606. Each sub-assembly 602 and 604 has a respective outer ring 612 and 614 around its perimeter, with respective, opposed mounting faces 612a and 614a. The mounting faces 612a and 614a are attached to the respective ends 606a and 606b of the central housing 606, using a thin layer of adhesive 610a and 610b.

The outer ring 612 may be formed integrally with the housing of the collimator sub-assembly 602, or may be formed separately and fitted over the sub-assembly 602. In the latter case, each sub-assembly 602 and 604 may be attached to its respective ring 612 and 614 with a layer of adhesive 608a and 608b. Typically, the inner diameter of the ring 612 is tolerated so that only a thin layer of adhesive 608a and 608b is required, for example around 20 $\mu$m. It will be appreciated that the ring 614 may be formed in the same manner. It will also be appreciated that the rings 612 and 614 need not completely encircle their respective sub-assemblies, but may only partially encircle the respective sub-assemblies.

The rings 612 and 614 are respectively attached to the central housing 606 by layers of adhesive 610a and 610b. These layers of adhesive 610a and 610b may be made thin, for example around 20 $\mu$m or. When aligning the device, the sub-assemblies 602 and 604 may be angled such that the layers of adhesive 610a and 610b have a varying bond thickness. Typically the angular adjustment is small, of the order of one or two degrees, so variations in bond line thickness are small.

The coefficient of thermal expansion (CTE) of the rings 612 and 614 is advantageously similar to that of the housings of the collimator sub-assemblies 602 and 604. Typically, the housings of the sub-assemblies 602 and 604 are formed of glass, such as a borosilicate glass, or any other suitable material. The rings 612 and 614 may be formed from the same material as the housings for the sub-assemblies 602 and 604, or from another material that has a CTE similar to that of the material of the collimators 602 and 604.

The central housing 606 may also be formed of a material having a CTE similar to that of the housings of the sub-assemblies 602 and 604 and the rings 612 and 614. For example, the central housing 606 may also be formed from the same material as the housings of the sub-assemblies 602 and 604, for example a glass such as borosilicate glass, or from other materials.

The sub-assemblies 602 and 604 may include optical elements in addition to the fibers and the focusing optics. For example, one or both of the sub-assemblies 602 and 604 may include a filter, an isolator, a polarizer or the like. In addition, one or more optical elements 620 may be positioned within the central housing 606.

The coefficient of thermal expansion of the adhesive 608a, 608b, 610a and 610b may also be similar to that of the sub-assemblies. For example, where the housings for the sub-assemblies 602 and 604 are formed of borosilicate glass, the adhesive may be 3410-type cured epoxy available from Electronics Materials Inc., Breckenridge, Colo. This epoxy is loaded with silica particles having a diameter of less than around 20 μm. The particles act as spacers to space the parts that are being epoxied together.

An advantage of this embodiment of device 600 is that the thickness of the adhesive bond lines is reduced, and the variation in the bond line thickness is also reduced. Consequently, any misalignment that occurs due to the differential in thermal expansion between the adhesive and the collimator housings is also reduced. This approach also permits the use of materials whose coefficients of thermal expansion are matched, so as to further reduce the effects of temperature change.

Another advantage of the invention arises when the axes of the different sub-assemblies are not coincident. This may arise, for example, where an optical element within the device 600 offsets a light beam propagating from one sub-assembly to the other. In the approach illustrated in FIG. 2, offsetting the axes of the two sub-assemblies results in the adhesive on one side of the sub-assembly being thinner than on the other side of the sub-assembly. This may contribute to thermally-induced misalignment of the device. In the present invention, on the other hand, the axes of the sub-assemblies may be offset from one another, as illustrated, without a resulting change in the thickness of the adhesive layer. Thus, the device of the present invention may manifest a reduced thermally-induced misalignment.

Another advantage of some embodiments of the present invention where the ring is attached to the outside of the sub-assembly housing is that the amount by which the housing protrudes into the central housing may be adjusted. If the adhesive layer 610a or 610b is wedged in the process of aligning the two sub-assemblies 602 and 604, the collimator sub-assembly 602 or 604 may rotate about a center when the adhesive layer 610a or 610b expands or contracts under changing temperature conditions. Having the ring adjustable along the sub-assembly housing permits selection of the center of rotation relative to the collimator optics.

Figure 7:
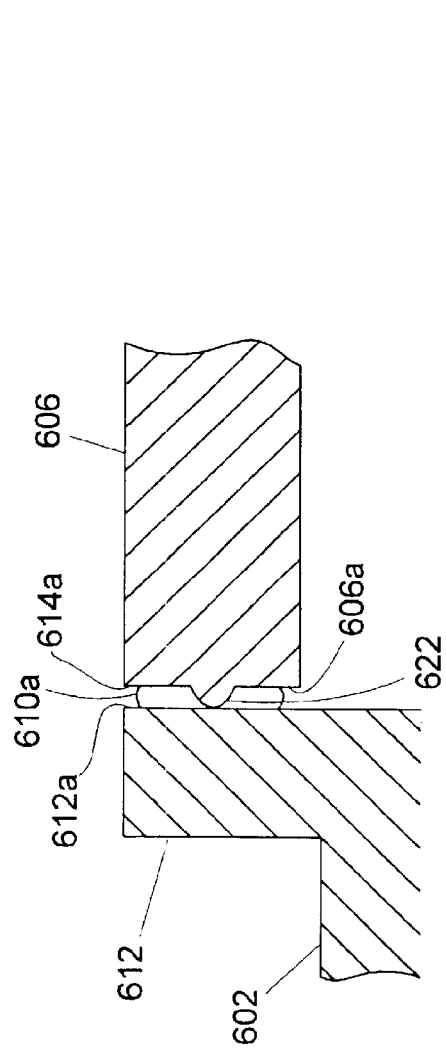
FIG. 7 schematically illustrates a method of joining two faces of the fiber optic device according to an embodiment of the present invention.

The effects of thermal expansion may also be reduced by using particular types of face joints between the rings 612 and 614, and the central housing 606. One approach to forming the face joints is illustrated schematically in FIG. 7. Adhesive 610a is provided between the mounting face 612a of the ring 612 and the end face 606a of the central housing 606. A protrusion 622, extending towards the mounting face 612a, is provided on the end face 606a. The joint is made by supplying adhesive 610a between the faces 606a and 612a, and pressing the ring 612 and the central housing 606 together while the adhesive 610a cures at high temperature, for example in excess of 100° C.

The force of pressing the faces 606a and 612a together expels the adhesive from between the protrusion 622 and the mounting face 612a, so that the protrusion 622 contacts the surface 612a. The adhesive 610a may have a CTE that is higher than that of the materials forming the ring 612 and the central housing 606, so when the temperature of the adhesive 610a cools, the adhesive 610a remains under tension, while the ring 612 and the central housing remain in contact. This provides a butt joint that remains stable under a wide range of temperature conditions. This type of joint is explained further in U.S. patent application Ser. No. 09/999, 533, incorporated herein by reference. It will be appreciated that the protrusion may be provided on the ring 612 rather than the central housing 606. Furthermore, the same approach may be used to attach the other collimator sub-assembly 604 to the central housing, although this is not necessary for purposes of the invention.

Figure 8A:
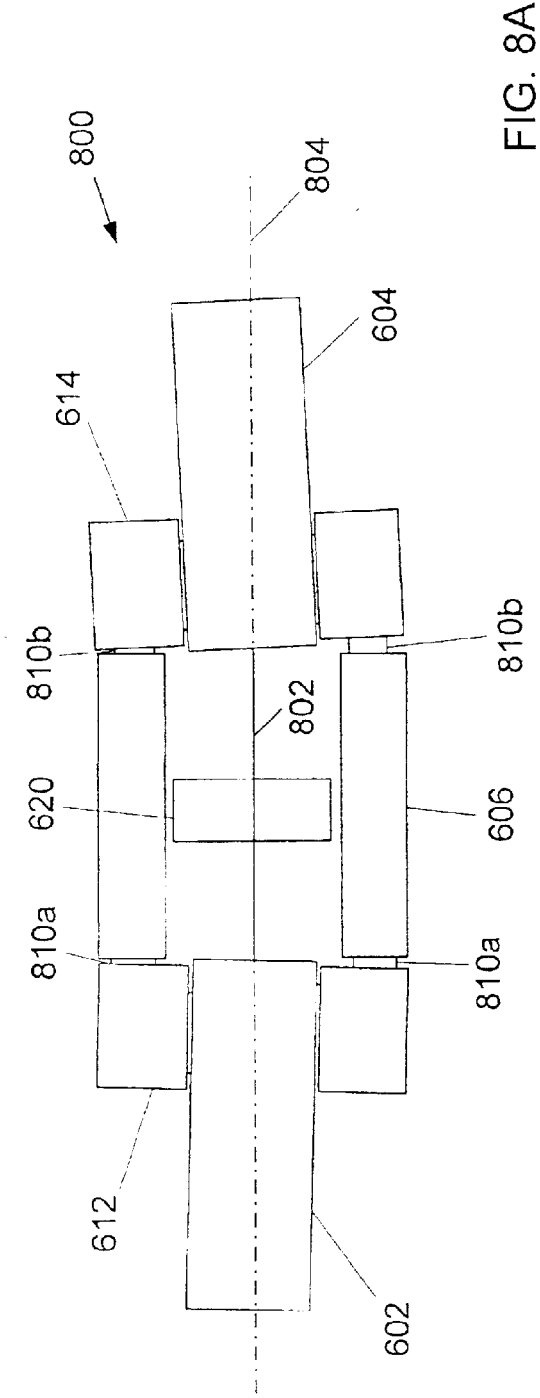
FIGS. 8A and 8B schematically illustrate different approaches to aligning collimator units to the central housing according to an embodiment of the present invention.
Figure 8B:
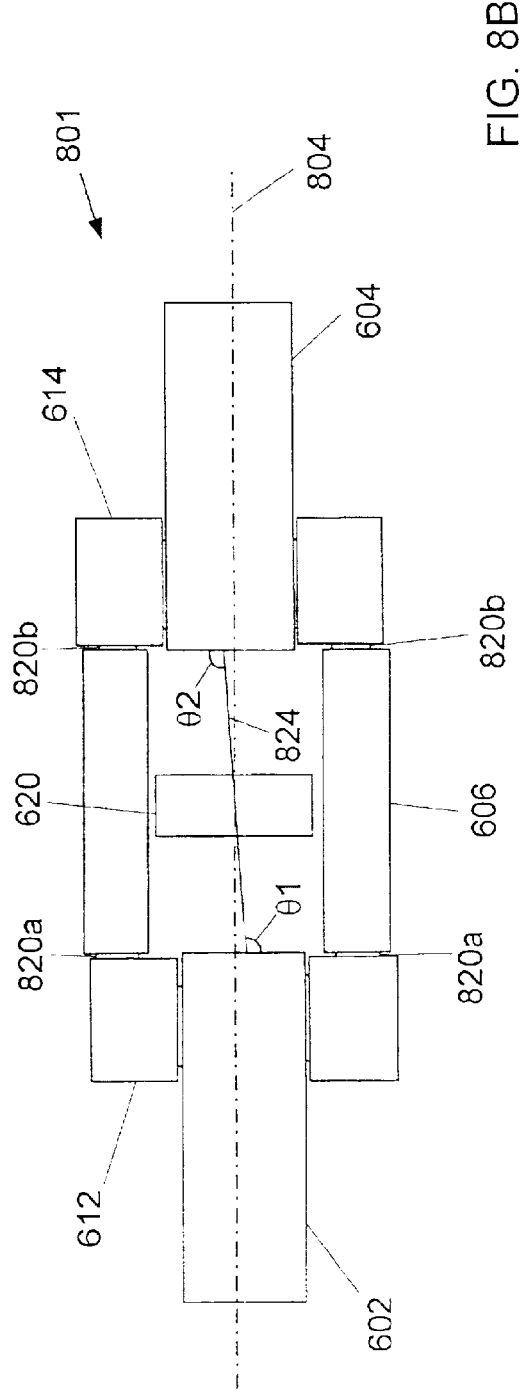

An approach to reducing the thickness of the glue lines between the central housing 606 and the rings 612 and 614 is now described with reference to FIGS. 8A and 8B. It is sometimes the case that the light emerges from a collimator sub-assembly in a direction that is not parallel to the axis of that sub-assembly, which may lead to an increase in the thickness of the glue lines. This is illustrated in FIG. 8A, which illustrates a device 800 where the light 802 (solid line) propagates between the collimator units 602 and 604 in a direction parallel to the device axis 804. The collimator units 602 and 604, however, do not lie parallel to the axis 804. Therefore, in order to align the light from one collimator unit to the other, the layers of adhesive 810a and 810b are wedged. In the illustrated embodiment, the wedged layers of adhesive have relatively thick portions at the bottom of the device 800. This may lead to misalignment of the device 800 under changes of temperature, due to the different expansion or contraction of the thin and thick portions of the wedged adhesive.

The amount of wedge in the layers of adhesive 810a and 810b may be reduced, if not removed altogether, by rotating one of the collimator units 602 and 604 by 180° about the axis 804. In such a case, schematically illustrated in FIG. 8B, the angle, θ1, of propagation of the beam path from the first collimator unit 602 or 604 relative to the axis 804 is countered by the angle, θ2 of propagation of the beam path from the second collimator unit. Accordingly, even though the light 824 passing between the collimator units 602 and 604 may not be parallel to the device axis 804, the collimator units 602 and 604 may be set parallel to the device axis 804. The centers of the collimator units 602 and 604 are typically offset from the axis 804. This arrangement enables the layers of adhesive 820a and 820b to be thin and parallel, advantageously leading to increased stability in the alignment of the device 801 under conditions of changing temperature.

As noted above, the present invention is applicable to fiber optic devices and is believed to be particularly useful in fiber optic devices that use one or more dual fiber collimator units, such as filter units. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification.

We claim:

1. A fiber optic device, comprising:
a first collimator sub-assembly having a first free-space end;
a second collimator sub-assembly having a second free-space end opposing the first free-space end of the first collimator;
a central housing having first and second ends and being disposed between the first and second collimator sub-assemblies, a first ring on the first collimator sub-assembly being mounted to the first end of the central housing and a second ring on the second collimator sub-assembly being mounted to the second end of the central housing;

wherein one of the first end of the central housing and a mounting face of the first ring is includes a protruding member directed towards the other of the first end of the central housing and the mounting face of the first ring.

2. A device as recited in claim 1, wherein the first collimator sub-assembly is a single fiber collimator sub-assembly having a first fiber coupling to a first light condensing unit.

3. A device as recited in claim 2, wherein the second collimator sub-assembly is a single fiber collimator sub-assembly having a second fiber coupling to a second light condensing unit.

4. A device as recited in claim 2, wherein the second collimator sub-assembly is a dual fiber collimator sub-assembly having third and fourth fibers coupling to a second light condensing unit.

5. A device as recited in claim 1, wherein the first collimator sub-assembly is a dual fiber collimator sub-assembly having first and second fibers coupling to a first light condensing unit.

6. A device as recited in claim 5, wherein the second collimator sub-assembly is a dual fiber collimator sub-assembly having third and fourth fibers coupling to a second light condensing unit.

7. A device as recited in claim 1, wherein the central housing is formed from the same material as the rings of the first and second collimator sub-assemblies.

8. A device as recited in claim 1, wherein the first ring is formed integrally with a housing of the first collimator sub-assembly.

9. A device as recited in claim 1, wherein the first ring is mounted on the first collimator sub-assembly using an adhesive.

10. A device as recited in claim 1, wherein at least one of the first and second collimator sub-assemblies includes one or more fibers optically coupled to a focusing unit to produce a collimated beam of light transmitted from one of the one or more fibers and an optical element disposed in the collimated beam of light.

11. A device as recited in claim 10, wherein the optical element is a filter.

12. A device as recited in claim 1, further comprising an optical element disposed within the central housing to receive collimated light from one of the first and second collimator sub-assemblies.

13. A device as recited in claim 12, wherein the optical element is a filter.

14. A device as recited in claim 12, wherein the optical element is an isolator unit.

15. A device as recited in claim 1, wherein the protruding member contacts the other of the first end of the central housing and the mounting face of the first ring, and adhesive is provided between portions of the first end of the central housing and the mounting face of the first ring not in contact.

16. A device as recited in claim 1, wherein a light path between the collimator sub-assemblies is not parallel with an axis through the central housing and the collimator sub-assemblies are mounted parallel to the axis and offset relative to the axis.

17. An optical system, comprising:
an optical transmitter producing output light;
an optical receiver receiving at least a portion of the output light; and
an optical fiber link coupling between the optical transmitter and the optical receiver, the optical fiber link including a fiber device having a first collimator sub-assembly having a first free-space end;
a second collimator sub-assembly having a second free-space end opposing the first free-space end of the first collimator;
a central housing having first and second ends and being disposed between the first and second collimator sub-assemblies, a first ring on the first collimator sub-assembly being mounted to the first end of the central housing and a second ring on the second collimator sub-assembly being mounted to the second end of the central housing;
wherein one of the first end of the central housing and a mounting face of the first ring is includes a protruding member directed towards the other of the first end of the central housing and the mounting face of the first ring.

18. A system as recited in claim 17, further comprising an isolator unit disposed within the fiber device to provide optical isolation for light passing between the first and second collimator sub-assemblies.

19. A system as recited in claim 17, further comprising a filter unit disposed within the fiber device to filter light passing between the first and second collimator sub-assemblies.

20. A system as recited in claim 17, further comprising one or more optical amplifier units disposed on the optical fiber link between the optical transmitter and the optical receiver.

21. A system as recited in claim 17, wherein the optical transmitter includes modulated light sources operating at different wavelengths and optical combining elements to combine outputs from the modulated light sources into a fiber output coupled to the optical fiber link.

22. A system as recited in claim 17, wherein the optical receiver includes optical separating elements to separate different wavelengths of light received from the optical fiber link and to direct light at different wavelengths to respective detectors.

23. A system as recited in claim 17, further comprising an optical add/drop multiplexer disposed on the optical fiber link.

24. A method of manufacturing a fiber device, comprising:
providing a first and a second collimator sub-assembly, each collimator sub-assembly being provided with rings on outside surfaces of respective sub-assembly housings,
placing a central housing between the first and second collimator sub-assemblies;
providing a protruding member on one of the first mounting face and the first end of the central housing;
attaching a first mounting face of the ring of the first collimator sub-assembly to a first end of the central housing by providing adhesive between the first mounting face and the first end of the central housing, forcing the protrusion to contact the other of the first mounting face and the first end of the central housing, and curing the adhesive at a cure temperature; and
attaching a second mounting face of the ring of the second collimator sub-assembly to a second end of the central housing so that light passes in free space between the first and second collimator sub-assemblies.

25. A method as recited in claim 24, wherein the cure temperature is higher than a normal operating temperature of the fiber device, and the adhesive has a coefficient of thermal expansion higher than the coefficient of thermal expansion of the protruding member.

26. A method as recited in claim 24, wherein providing the first and second collimator sub-assemblies includes attaching rings on the outside surfaces of the first and second collimator sub-assembly housings.

27. A method as recited in claim 24, further comprising orienting the first and second collimator sub-assemblies about an axis through the central housing and off-setting the first and second collimator sub-assemblies relative to the axis so that a light path between the first and second collimator sub-assemblies is non-parallel to the axis and the first and second collimator sub-assemblies are substantially parallel to the axis.

* * * * *

UNITED STATES PATENT AND TRADEMARK OFFICE
CERTIFICATE OF CORRECTION

PATENT NO.         : 6,804,435 B2                                           Page 1 of 1
APPLICATION NO. : 10/103475
DATED              : October 12, 2004
INVENTOR(S)        : Robilliard et al.

It is certified that error appears in the above-identified patent and that said Letters Patent is hereby corrected as shown below:

At Claim 1, Column 9, Line 2, please remove the first occurrence of "is"

At Claim 17, Column 10, Line 14, please remove the first occurrence of "is"

Signed and Sealed this

Eleventh Day of December, 2007

JON W. DUDAS
*Director of the United States Patent and Trademark Office*